(12) United States Patent
Kvieska

(10) Patent No.: US 11,731,623 B2
(45) Date of Patent: Aug. 22, 2023

(54) ANTICIPATING MODULE, ASSOCIATED DEVICE AND METHOD FOR CONTROLLING PATH IN REAL TIME

(71) Applicants: Renault s.a.s., Boulogne-Billancourt (FR); NISSAN MOTOR CO., LTD., Yokohama (JP)

(72) Inventor: Pedro Kvieska, Versailles (FR)

(73) Assignees: Renault s.a.s., Boulogne-Billancourt (FR); NISSAN MOTOR CO., LTD., Yokohama (JP)

( * ) Notice: Subject to any disclaimer, the term of this patent is extended or adjusted under 35 U.S.C. 154(b) by 14 days.

(21) Appl. No.: 17/599,821

(22) PCT Filed: Mar. 27, 2020

(86) PCT No.: PCT/EP2020/058820
§ 371 (c)(1),
(2) Date: Sep. 29, 2021

(87) PCT Pub. No.: WO2020/201141
PCT Pub. Date: Oct. 8, 2020

(65) Prior Publication Data
US 2022/0194371 A1  Jun. 23, 2022

(30) Foreign Application Priority Data

Apr. 1, 2019 (FR) ...................... 1903456

(51) Int. Cl.
*B60W 30/12* (2020.01)
*B60W 30/02* (2012.01)
(Continued)

(52) U.S. Cl.
CPC ............ *B60W 30/12* (2013.01); *B60W 30/02* (2013.01); *B60W 40/109* (2013.01);
(Continued)

(58) Field of Classification Search
CPC .... B60W 30/12; B60W 30/02; B60W 40/109; B60W 2300/36; B60W 2520/125; B62D 15/021
See application file for complete search history.

(56) References Cited

U.S. PATENT DOCUMENTS

| 9,376,140 B2* | 6/2016 | Chai ...................... B62D 6/008 |
| 2006/0020382 A1* | 1/2006 | Shin ...................... B62D 7/159 |
| | | 180/443 |

(Continued)

FOREIGN PATENT DOCUMENTS

| FR | 2 991 276 A1 | 12/2013 |
| FR | 2 992 931 A1 | 1/2014 |

(Continued)

OTHER PUBLICATIONS

International Search Report dated Jun. 9, 2020 in PCT/EP2020/058820 filed Mar. 27. 2020, 2 pages.

(Continued)

*Primary Examiner* — Ramsey Refai
(74) *Attorney, Agent, or Firm* — Oblon, McClelland, Maier & Neustadt, L.L.P.

(57) ABSTRACT

An anticipating module for a device for controlling, in real time, the path of a motor vehicle includes a sub-module for computing a turning command for compensating for the curvature of a bend in the lane of the vehicle and a variable-gain device that is connected to an output of the computing sub-module. The gain of the variable-gain device is connected to a controller to adjust the gain so as to decrease the lateral offset between the centre of gravity of the vehicle and the centre of the lane of the vehicle depending on the result of the comparison of components of a vector of current measurements of state variables of the device to one another and to a detection threshold, the output (Continued)

of the variable-gain device being the steering command for compensating for the curvature of the bend.

7 Claims, 7 Drawing Sheets

(51) Int. Cl.
    *B60W 40/109*     (2012.01)
    *B62D 15/02*     (2006.01)

(52) U.S. Cl.
    CPC ....... *B62D 15/021* (2013.01); *B60W 2300/36* (2013.01); *B60W 2520/125* (2013.01)

(56) References Cited

U.S. PATENT DOCUMENTS

| | | | | |
|---|---|---|---|---|
| 2006/0217860 | A1* | 9/2006 | Ihara | B62D 15/025 701/41 |
| 2006/0217861 | A1* | 9/2006 | Ihara | B62D 15/029 701/41 |
| 2007/0213901 | A1* | 9/2007 | Shin | B62D 6/007 180/443 |
| 2012/0016646 | A1* | 1/2012 | Takenaka | B60T 8/172 703/2 |
| 2015/0165973 | A1* | 6/2015 | Takemae | B60R 1/00 348/148 |
| 2015/0225014 | A1* | 8/2015 | Takeda | G06V 20/588 701/41 |

FOREIGN PATENT DOCUMENTS

| | | |
|---|---|---|
| FR | 3 040 349 A1 | 3/2017 |
| FR | 3 051 756 A1 | 12/2017 |
| JP | 2009-234560 A | 10/2009 |

OTHER PUBLICATIONS

Japanese Office Action dated Oct. 25, 2022 in Japanese Patent Application No. 2021-557518, 4 pages.

* cited by examiner

ANTICIPATING MODULE, ASSOCIATED DEVICE AND METHOD FOR CONTROLLING PATH IN REAL TIME

The present invention relates to a path control device of a vehicle.

More specifically, the present invention relates to a real-time path control device of a vehicle that is designed to offset the curvature of a bend in the lane of the vehicle, an anticipating module built into the device and an implementation method for such a device.

Motor vehicles can be fitted with path control devices that are designed to help the driver to keep the vehicle in the lane, and notably to keep the vehicle in the center of the lane. Such devices can also be found in autonomous vehicles where driving is delegated entirely to the vehicle. Such devices act on the steering of the vehicle by adjusting the steering angle of the steered wheels of the vehicle. The appropriate steering angle for the situation of the vehicle is determined using a control algorithm contained in the device. The algorithm implements a control law and uses a dynamic model of the vehicle. Such a control law for helping to keep the vehicle in the center of the lane is commonly referred to as "lane centering assist" (LCA).

For the sake of comfort, the control should be smooth and not cause any jolts that could discomfort or surprise the driver.

Application FR3051756 filed by the same applicant represents the prior art illustrated in FIGS. 1 to 5. This application describes a real-time path control device DISP of a vehicle that is notably intended to ensure passenger comfort.

Figure 1:
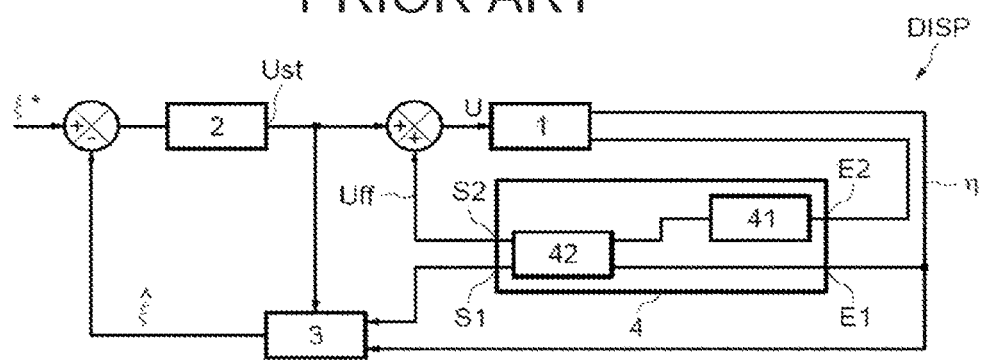

FIG. 1 shows said real-time path control device DISP applied to a motor-driven vehicle 1 with two steered wheels, preferably the front wheels of the vehicle, controlled by an actuator controlled by a control signal u.

Hereinafter, the operator Ẋ denotes the derivative of x.

The steered front wheels of the vehicle 1 are controlled by an actuator controlled by a control signal U.

The vehicle 1 also has a sensor designed to measure a parameter of the vehicle, such as the real longitudinal speed V, the steering angle $\delta$ of the front wheels, yaw rate $\dot{\Psi}$ of the vehicle or the direction angle, for example the static direction angle corresponding to the angle of the front wheels to the nearest gear ratio. The vehicle can also be equipped with a RaCam device combining the properties of an optical camera and a radar to provide the model of a guide line of the traffic lane of the vehicle in the form of a polynomial y(x) or an optical camera used to determine the polynomial y(x).

The vehicle 1 is equipped with an on-board processor comprising a controller device 2 used to generate a control signal Ust to make a physical state vector $\xi$ of the vehicle compliant with a set-point state vector $\xi^*$ to ensure that the vehicle 1 follows the desired path.

The on-board processor also includes an observer 3 for generating, in real time, a estimated path-follow state vector $\hat{\xi}$ of the vehicle 1 moving at speed V using the command Ust and a vector η of current measurements of state variables correlated to the path-following physical state vector $\xi$ of the vehicle 1.

The observer device 3 is designed to generate, in real time, an estimated state vector $\hat{\xi}$ representing the actual state vector $\xi$ as reliably as possible.

The on-board processor also includes an anticipating module 4 adding a second steering command Uff as a function of a curvature γff of a bend to the first steering command Ust produced by the device 2 to offset the bend.

The second steering command Uff enables the vehicle 1 to negotiate the bend of curvature γff. The second command is added to the control signal Ust to cause the controller device 2 to adjust the path of the vehicle 1 to cause the vehicle 1 to follow a straight route.

Consequently, the control signal U is also the sum of the first command Ust and the second command Ust.

The real-time path control device of the vehicle 1 includes the actuator, the speed sensor, the sensor for measuring a steering angle $\delta$, the sensor for measuring the yaw rate $\dot{\Psi}$ and the RaCam device, the device 2 and the module 4.

The physical state vector $\xi$ of the vehicle is:

$$\xi = \begin{pmatrix} \dot{\Psi} \\ \Psi \\ \dot{yl} \\ yl \\ \dot{\delta} \\ \delta \\ \int -yl \end{pmatrix} \quad (1)$$

where $\Psi$ is the relative heading angle between the axis of the vehicle and the tangent to the reference path, $\dot{yl}$ is the lateral departure speed of the vehicle from the ideal path of the vehicle, yl is the lateral deviation between the center of gravity of the vehicle and the center of the lane of the vehicle and the tangent to the forward path of the vehicle, $\dot{\delta}$ is the variation in the steering angle and $\int$–yl is the integral of the lateral position.

The set-point state vector $\xi^*$ is:

$$\xi^* = \begin{pmatrix} \dot{\Psi}_{ref} \\ \Psi_{ref} \\ \dot{yl}_{ref} \\ yl_{ref} \\ \dot{\delta}_{ref} \\ \delta_{ref} \\ \int -yl_{ref} \end{pmatrix} \quad (2)$$

And the estimated state vector $\hat{\xi}$ is:

$$\hat{\xi} = \begin{pmatrix} \dot{\Psi}_{est} \\ \Psi_{est} \\ \dot{yl}_{est} \\ yl_{est} \\ \dot{\delta}_{est} \\ \delta_{est} \\ \int -yl_{est} \end{pmatrix} \quad (3)$$

The vector $\xi$ is unknown since the internal state of the vehicle 1 is not fully accessible.

The device 3 implements a vehicle model known as the bicycle model provided in the following matrix form:

$$\dot{\xi} = A \cdot \xi + B_\delta \cdot \delta_{req} + B_\rho \cdot \gamma ff \quad (4)$$

where $\delta_{req}$ is the sum of the control signal Ust and the second steering command Uff, and γff is the radius of curvature of the bend.

The value of the angle $\delta_{ref}$ is equal to the command Uff.

The steering angle $\delta$ and the reference steering angle $\delta_{ref}$ are linked by a second-order transfer function modelling the power-assisted steering.

The matrix A includes dependent constant and variable coefficients throughout a given driving sequence, dependent on the following parameters of the vehicle 1:

the drift stiffness of the front wheels $C_f$,
the drift stiffness of the rear wheels $C_r$,
the center of gravity distance to the front axle $l_f$,
the center of gravity distance to the rear axle $l_r$,
the total mass of the vehicle m,
the speed of the vehicle V,
the inertia of the vehicle about a vertical axis passing through the center of gravity J thereof,
a damping coefficient of the second-order function ξ, and
a particular pulsation of the second-order transfer function ω.

The matrix $B_\delta$ depends on the particular pulsation ω and the speed V, and the matrix $B_\rho$ depends on the speed V.

The value of the parameters of the vehicle 1 is defined when the vehicle 1 is not under load and the tire pressure is at optimum value, the parameters being fixed throughout the entire lifetime of the vehicle 1.

The device 3 receives, over a first input, a vector η of current measurements correlated to the physical state vector ξ by the following instrumental relation C:

$$\eta = \begin{bmatrix} 1 & 0 & 0 & 0 & 0 & 0 & 0 \\ 0 & 1 & 0 & 0 & 0 & 0 & 0 \\ 0 & 0 & 0 & 1 & 0 & 0 & 0 \\ 0 & 0 & 0 & 0 & 0 & 1 & 0 \\ 0 & 0 & 0 & 0 & 0 & 0 & 1 \end{bmatrix} \cdot \xi \quad (5)$$

The vector η of current measurements has five components:

$$\eta = \begin{pmatrix} \Psi \\ \dot\Psi \\ yl \\ \delta \\ \int -yl \end{pmatrix} \quad (6)$$

The yaw rate $\dot\Psi$ is measured by the yaw rate sensor.

The RaCam device determines the polynomial y(x).

The observer 3 receives, over a second input, the command Ust, which is the steering angle δ.

A third input of the observer 3 is linked to a first output S1 of the anticipating module 4.

The anticipating module 4 also has a second output S2 linked to an adder such that the control signal U is the sum of the control signal Ust and the control signal Uff, and a first input E1 linked to the vehicle 1 to receive the vector η of current measurements, and a second input E2 linked to the vehicle 1 to receive the polynomial y(x).

The relative heading angle Ψ, the lateral deviation yl are determined using the polynomial y(x) and the integral of the lateral position ∫-yl is calculated.

The anticipating module 4 includes a first sub-module linked to the second input E2, and a second sub-module 42 linked to the first sub-module 41, to the input E1 and to the outputs S1 and S2.

The first sub-module 41 receives the polynomial y(x) giving the geometry of the guide line of the traffic lane for each point at the distance x in front of the vehicle 1 and determines the curvature γff sent to the second sub-module 42.

The second sub-module 42 also receives the vector η of current measurements.

During the bend of curvature γff, the module 4 corrects the relative heading angle Ψ, the yaw rate $\dot\Psi$ and the wheel angle δ.

The closed loop comprising the vehicle 1 and the devices 2 and 3 minimizes the state vector ξ about the zero vector corresponding to a straight line, the set-point vector ξ* being equal to the zero vector.

The dynamics of the closed loop are too slow to ensure a good level of comfort.

The anticipating module 4 operates an open loop to ensure good cornering performance.

The second sub-module 42 calculates the wheel angle $\delta_{eq}$ corresponding to the curvature γff and a related pseudo-calculated measurement vector $\eta_{eq}$.

The wheel angle $\delta_{eq}$ is given by the following equation:

$$\delta eq = \frac{-(c_f l_f - c_r l_r) \cdot m \cdot V^2 - (c_f l_f - c_r l_r)^2 + (c_f + c_r)(c_f l_f^2 + c_r l_r^2)}{c_f c_r (l_f + l_r)} \gamma f f \quad (7)$$

and the pseudo-calculated measurement vector $\eta_{eq}$ is:

$$\eta_{eq} = \begin{pmatrix} \Psi_{eq} \\ \dot\Psi_{eq} \\ yl_{eq} \\ \delta_{eq} \\ \int -yl_{eq} \end{pmatrix} = \begin{pmatrix} V \cdot \gamma ff \\ \dot\Psi_{eq} \\ 0 \\ \delta_{eq} \\ 0 \end{pmatrix} \quad (8)$$

where:

$$\dot\Psi_{eq} = \frac{l_f \cdot m \cdot V^2 + l_f(c_f l_f - c_r l_r) - (c_f l_f^2 + c_r l_r^2)}{c_r(l_f + l_r)} \gamma ff \quad (9)$$

The angle $\delta_{eq}$ is sent by the second output S2 of the module 4 and the measurement vector $\eta_{eq}$ is sent by the first input S1 so that the pseudo-calculated measurement vector $\eta_{cq}$ is deducted from the measurement vector η so that the observer module 3 acts only on the path deviations on a virtual straight lane.

However, the anticipating module 4 is based on the bicycle model and does not change throughout the lifetime of the vehicle 1.

When the physical parameters of the vehicle 1 change, for example if a mass is loaded into the trunk, or if the tires are deflated or damaged, the parameters of the anticipating module 4 are no longer correct and there is a consequent drop in performance, resulting in cornering with significant lateral deviation values in relation to the center of the lane.

Figure 2:
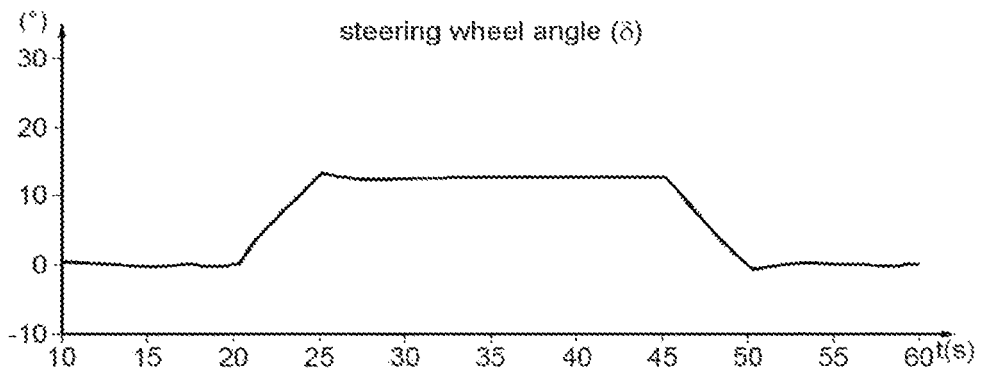
Figure 3:
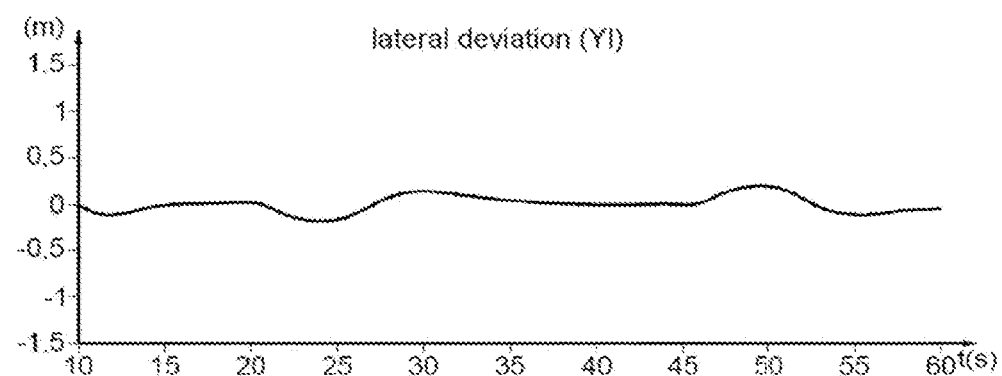

FIGS. 2 and 3 show the evolution of the steering angle δ and the lateral deviation yl over time following the action of the real-time path control device when the parameters of the vehicle 1 are at the nominal value and the trunk is empty.

A deviation of 18 cm is found at the entry and exit of the bend.

Figure 4:
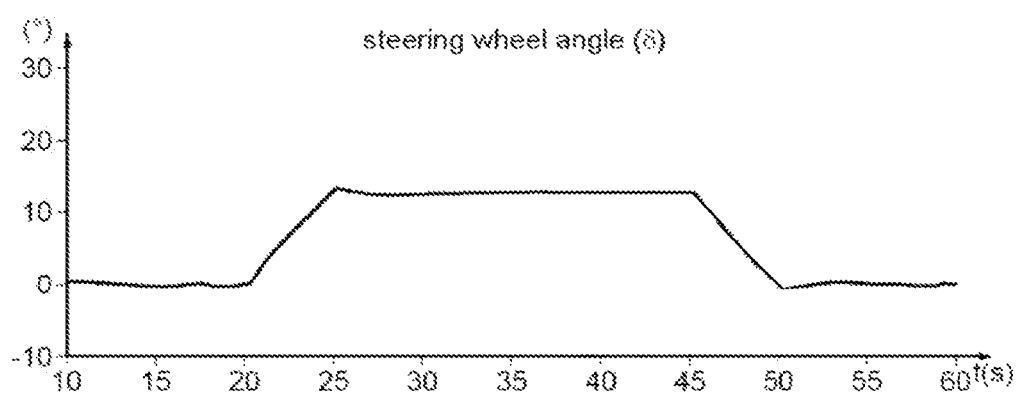
Figure 5:
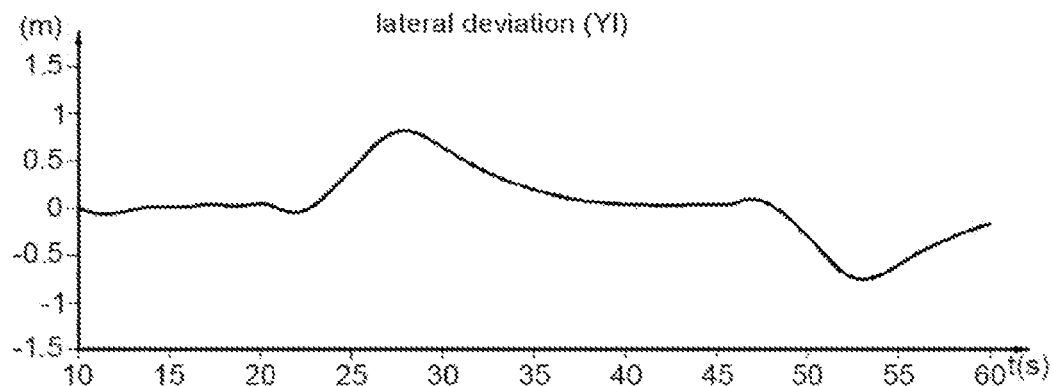

FIGS. 4 and 5 show the evolution of the steering angle δ and the lateral deviation yl over time following the action of the real-time path control device when there is an additional 300 g mass in the trunk of the vehicle 1.

A deviation of 75 cm is found at the entry and exit of the bend.

The vehicle 1 suffers from greater oversteer in relation to the nominal configuration shown in FIGS. 2 and 3.

The invention is therefore intended to make the real-time path control device more robust when cornering, by adapting the command from the anticipating module as a function of variations in the physical parameters of the vehicle.

In consideration of the foregoing, the invention proposes an anticipating module for a device for controlling the path of a motor vehicle in real time, said module comprising a sub-module for computing a steering command to offset the curvature of a bend in the lane of the vehicle, a variable-gain device being connected to an output of the computing sub-module.

The variable-gain device is linked to a controller able to adjust the gain value so as to decrease the lateral deviation between the center of gravity of the vehicle and the center of the lane of the vehicle as a function of the result of the comparison of components of a vector of current measurements of state variables of the device with one another and with a detection threshold, the output of the variable gain being the steering command to offset the curvature of the bend.

According to one feature, the module also includes a second computing sub-module linked to an output of the variable-gain device and designed to compute a measurement vector pseudo-calculated using a model of the vehicle.

Preferably, the model of the vehicle is a bicycle model.

The invention also relates to a real-time path control device of a vehicle designed to offset the curvature of a bend in a lane of a vehicle comprising an anticipating module as defined previously, and an observer generating, in real time, an estimated straight-lane-follow state vector of the vehicle such as to produce a steering command to stabilize the path of the vehicle in relation to the straight lane, the observer being linked to the anticipating module.

The invention also relates to a real-time path control method for a motor vehicle designed to offset the curvature of a bend in the lane of the vehicle.

The gain of a variable-gain device of an anticipating module is adjusted when vehicle oversteer in relation to the nominal configuration is detected, in order to reduce the lateral deviation between the center of gravity of the vehicle and the center of the lane of the vehicle.

Preferably, the vehicle is deemed to be oversteering in relation to the nominal configuration when the lateral deviation and the direction of the bend are oriented in the same direction in a reference frame of the vehicle and the lateral deviation is greater than a detection threshold.

Advantageously, the gain of the variable-gain device is reset when the lateral deviation and the direction of the bend are oriented in different directions in the reference frame of the vehicle and the lateral deviation is less than a detection threshold.

Other objectives, characteristics and advantages of the invention are set out in the description below, given purely by way of non-limiting example and in reference to the attached drawings, in which:

FIG. 1, as previously mentioned, is a schematic view of a real-time path control device for a vehicle according to the prior art,

FIG. 2

FIG. 3, as previously mentioned, show the evolution of the steering angle and the lateral deviation over time following the action of the control device according to the prior art when the parameters of the vehicle are at the nominal value and the trunk is empty,

FIG. 4

Figure 6:
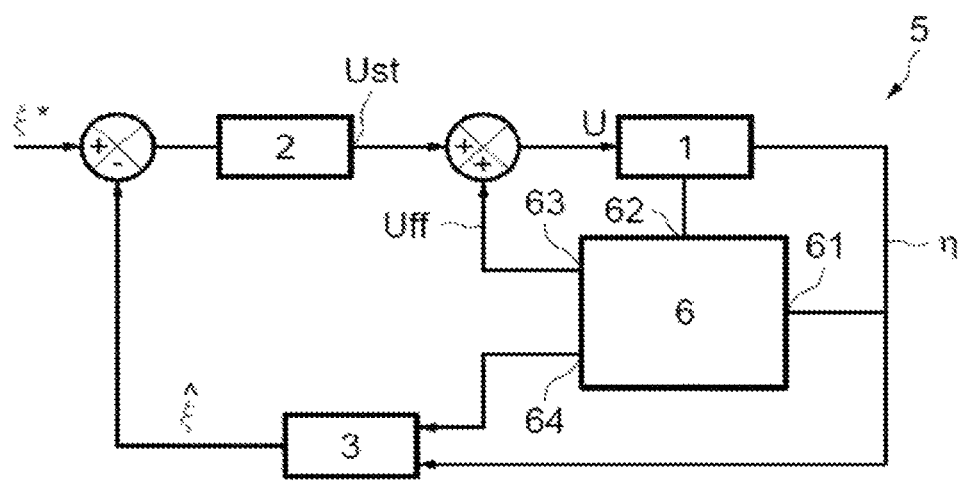
Figure 7:
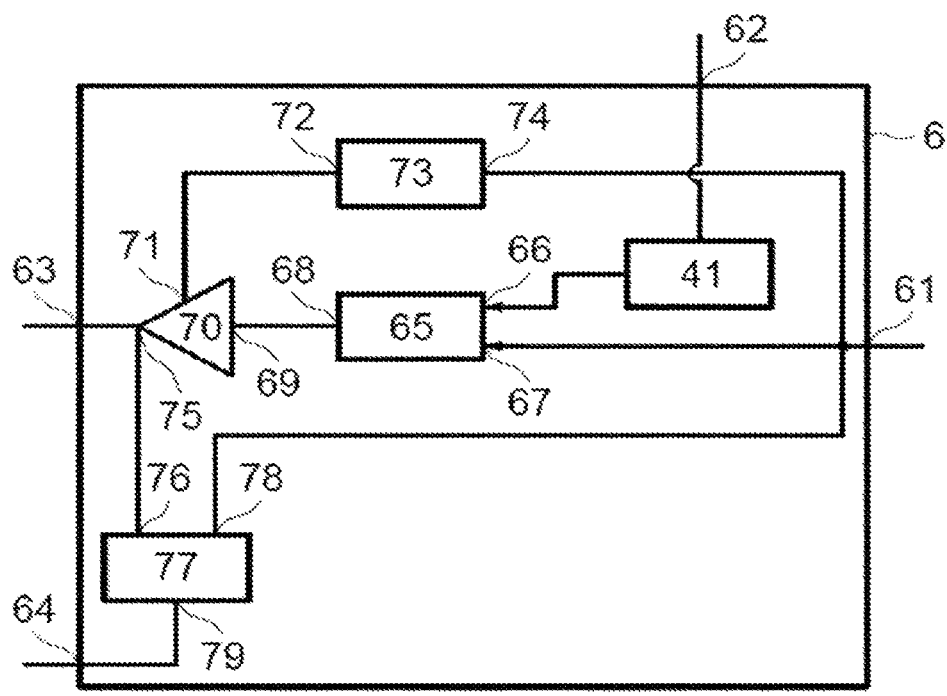
Figure 8:
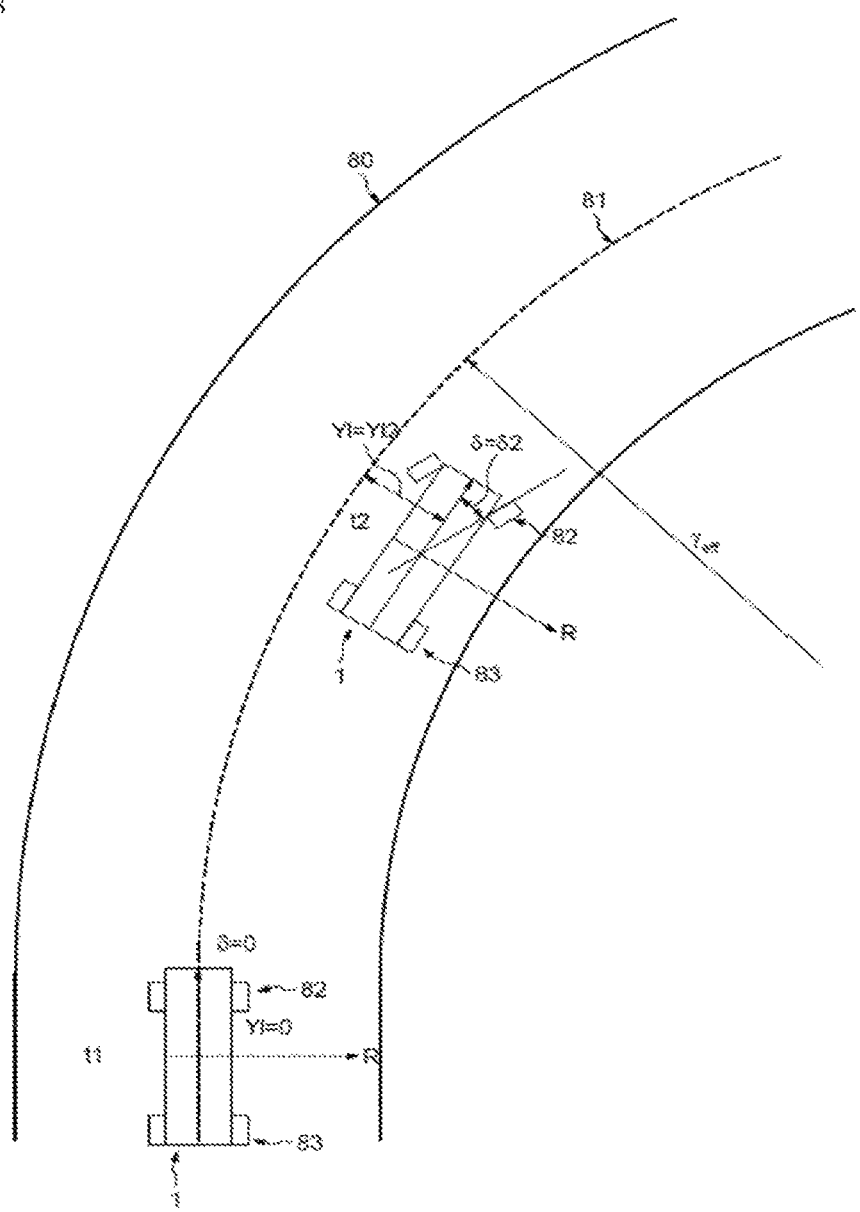
Figure 9:
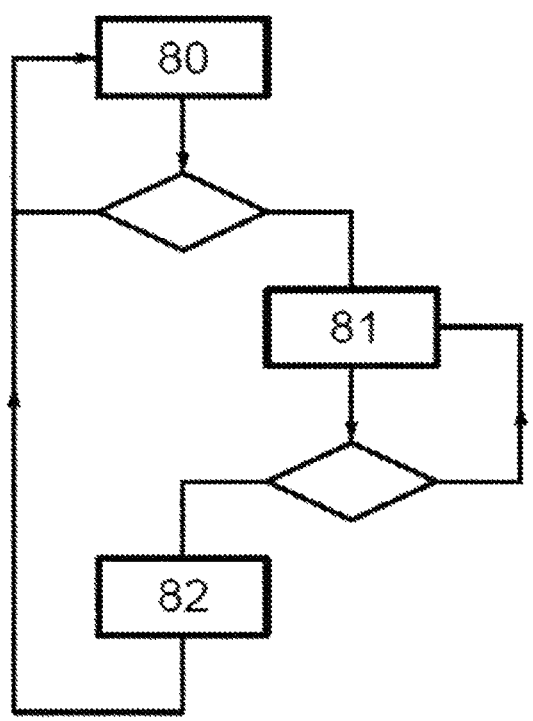

FIG. 5 show the evolution of the steering angle and the lateral deviation over time following the action of the control device according to the prior art when there is an additional mass in the trunk of the vehicle, FIG. 6 is a schematic view of an embodiment of a real-time path control device of a vehicle according to the invention, FIG. 7 shows an embodiment of the anticipating module according to the invention, FIG. 8 is a schematic view of a vehicle traveling in a lane with a bend, FIG. 9 shows an implementation method of a real-time path control device of a vehicle according to the invention, and

FIG. 10

Figure 11:
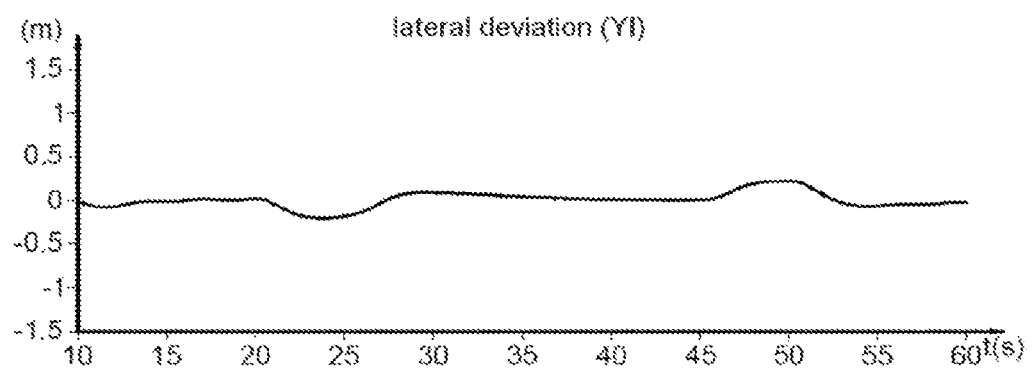

FIG. 11 show the evolution of the steering angle and the lateral deviation over time following the action of the control device according to the invention when there is an additional mass in the trunk of the vehicle.

FIG. 6 is a schematic view of a real-time path control device 5 of the vehicle 1 to offset the curvature of a bend in the lane of the vehicle 1 according to one aspect of the invention. The elements of the device 5 that are identical to the elements making up the device DISP in FIG. 1 are indicated using the same reference signs.

The vehicle 1, the controller device 2 for generating a control signal Ust and the observer 3 for generating, in real time, the estimated straight-lane-follow state vector $\hat{\xi}$ of the vehicle from the vector η of current measurements and the pseudo-calculated measurement vector $\eta_{eq}$ are shown.

The device 5 also includes an anticipating module 6 having a first input 61 linked to the vehicle 1 and receiving the vector η of current measurements, a second input 62 linked to the vehicle 1 and receiving the polynomial y(x), a first output 63 linked to the adder such that the control signal U is the sum of the control signal Ust and the control signal Ueff generated by the module 6 and a second output 64 linked to the third input of the observer 3.

The anticipating module 6 is an open loop.

FIG. 7 shows an embodiment of the anticipating module 6.

The anticipating module 6 includes the first sub-module for determining the curvature γff from the polynomial y(x) giving the geometry of the guide line of the traffic lane for each point at the distance x in front of the vehicle 1 determined by the RaCam device and linked to the input 62 of the module 6, a computing sub-module for computing a steering command 65 including a first input 66 linked to the output of the sub-module 41, a second input 67 linked to the input 61 of the module 6 and an output 68 linked to the input 69 of a variable-gain device 70.

The variable-gain device 70 has a control input 71 linked to an output 72 of a controller 73.

The controller 73 also has an input 74 linked to the input 61 of the module 6.

The variable-gain device 70 has an output 75 linked firstly to the first output 63 of the module 6, and secondly to a first input 76 of a second computing sub-module 77.

The second computing sub-module 77 also has a second input 78 linked to the first input 61 of the module 6 and an output 79 linked to the second output 64 of the module 6.

The computing sub-module for computing a steering command 65 calculates a steering command to offset the curvature γff.

The steering command is equal to the wheel angle $\delta_{cq}$ given by the equation (7) and implemented by the computing sub-module for computing a steering command 65.

The controller 73 controls the gain variable-gain device 70 so as to decrease the lateral deviation yl between the center of gravity of the vehicle 1 and the center of the lane of the vehicle depending on the result of the comparison of components of the vector η of current measurements of state variables of the device to one another and to a detection threshold S.

The second sub-module 77 determines the pseudo-calculated measurement vector $\eta_{eq}$ according to the equation (8).

In a variant, the first curvature determination sub-module 41 can be arranged outside the anticipating module 6.

FIG. 8 shows the vehicle 1 traveling in a lane 80 with the bend of curvature γff.

The vehicle 1 has a reference frame R, the origin of which for example coincides with the nominal center of gravity of the vehicle 1.

The path of the vehicle 1 follows a central guide line 81 of the lane 80.

At instant t1, the vehicle 1 is on a straight portion of the lane 80. The front wheels 82 and rear wheels 83 of the vehicle 1 are aligned, and the lateral deviation yl and the wheel angle δ are substantially zero.

At instant t2, the vehicle 1 is on the bend.

The device 5 reads a non-zero lateral deviation y12 between the nominal center of gravity of the vehicle 1 and the central guide line 81 of the lane 80, and generates a steering command Ust to offset the deviation between the set-point state vector ξ* and the estimated state vector ξ̂ such that the deviation is eliminated or moved towards zero.

The sign of the wheel angle $\delta_2$ enables the direction of orientation of the bend to be determined.

FIG. 9 shows an implementation method for the device 5.

During the step 80, the controller 73 determines whether the vehicle 1 is oversteering on the bend.

The vehicle 1 is deemed to be oversteering in relation to the nominal if the lateral deviation yl and the direction of the bend are oriented in the same direction in the reference frame R of the vehicle 1, and the value of the lateral deviation yl is greater than a detection threshold S.

In the reference frame R of the vehicle 1 shown in FIG. 8, the oriented angle $\delta_2$ and the lateral deviation y12 are positive.

Consequently, the lateral deviation y12 and the direction of the bend are oriented in the same direction.

It is therefore assumed that the lateral deviation y12 is greater than the detection threshold S.

The method advances to step 81.

If either one of the two conditions are not met, the method remains in step 80.

During step 81, the controller 73 sets the gain of the variable-gain device 70 to a predetermined value.

During this step, the gain of the variable-gain device changes from 1 to the predetermined value, for example 0.75.

The predetermined value is for example determined by testing the behavior of the vehicle 1 empirically or by digital simulation for different predetermined values.

Figure 10:
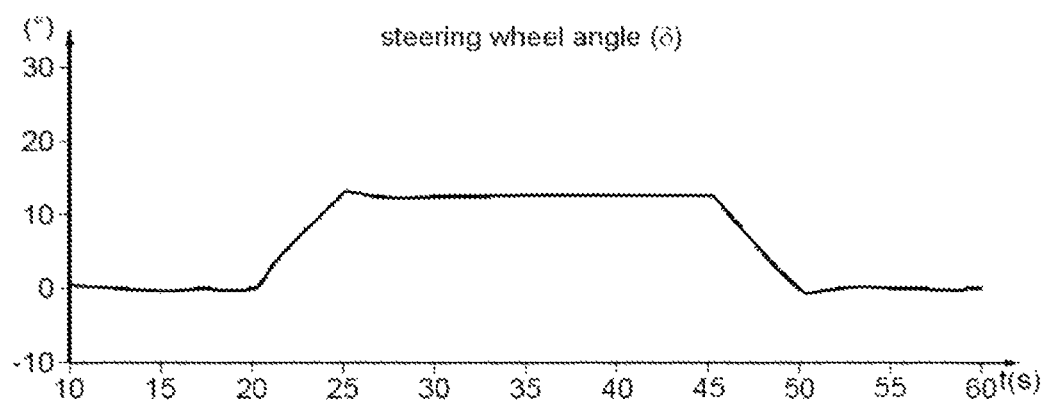

Adjusting the gain reduces the value yl of the lateral deviation between the center of gravity of the vehicle 1 and the center of the lane of the vehicle, as shown in FIGS. 10 and 11, which show the evolution of the steering angle δ and the lateral deviation yl over time following the action of the device 5, the trunk of the vehicle containing an additional 300 kg mass.

The lateral deviation y1 is reduced to 20 cm.

Furthermore, during the step 81, the controller 73 determines whether the vehicle 1 is still oversteering on the bend in relation to nominal.

In a step 82, if the lateral deviation yl and the direction of the bend are oriented in different directions in the reference frame R of the vehicle 1 and the lateral deviation yl is less than the detection threshold S, the controller 73 resets the gain of the variable-gain device 70.

The invention claimed is:

1. An anticipating module for a real-time path control device of a motor vehicle, the anticipating module comprising:
    computing sub-module circuitry configured to compute a steering command to offset a curvature of a bend in a lane of the vehicle, and
    a variable-gain device linked to an output of the computing sub-module circuitry,
    wherein the variable-gain device is linked to a controller configured to adjust a gain value so as to decrease a lateral deviation between a center of gravity of the vehicle and a center of the lane of the vehicle as a function of a result of a comparison of components of a vector of current measurements of state variables of the variable-gain device with one another and with a detection threshold, an output of the variable-gain device being the steering command to offset the curvature of the bend.

2. The anticipating module as claimed in claim 1, further comprising second computing sub-module circuitry linked to an output of the variable-gain device and configured to compute a measurement vector pseudo-calculated using a model of the vehicle.

3. The anticipating module as claimed in claim 2, wherein the model of the vehicle is a bicycle model.

4. A real-time path control device of a vehicle configured to offset a curvature of a bend in a lane of a vehicle, the real-time path control device comprising:
    an anticipating module that includes
        computing sub-module circuitry configured to compute a steering command to offset the curvature of the bend in the lane of the vehicle, and
        a variable-gain device linked to an output of the computing sub-module circuitry, the variable-gain device being linked to a controller configured to adjust a gain value so as to decrease a lateral deviation between a center of gravity of the vehicle and a center of the lane of the vehicle as a function of a result of a comparison of components of a vector of current measurements of state variables of the variable-gain device with one another and with a detection threshold; and
    observer circuitry configured to generate, in real time, an estimated straight-lane-follow state vector of the vehicle such as to produce the steering command to stabilize a path of the vehicle in relation to the straight lane, the observer circuitry being linked to the anticipating module.

5. A real-time path control method for a motor vehicle configured to offset a curvature of a bend in a lane of a vehicle, the method being performed by an anticipating module that includes computing sub-module circuitry configured to compute a steering command to offset the curvature of the bend in the lane of the vehicle, and a variable-gain device linked to an output of the computing sub-module circuitry, the variable-gain device being linked to a controller, the method comprising:
   adjusting, via the controller, a gain of the variable-gain device of the anticipating module when vehicle oversteer in relation to a nominal configuration is detected, in order to reduce a lateral deviation between a center of gravity of the vehicle and a center of the lane of the vehicle.

6. The real-time path control method as claimed in claim 5, further comprising:
   determining that the vehicle is oversteering in relation to the nominal configuration, when the lateral deviation and a direction of the bend are oriented in a same direction in a reference frame of the vehicle and the lateral deviation is greater than a detection threshold.

7. The real-time path control method as claimed in claim 6, further comprising:
   resetting the gain of the variable-gain device, when the lateral deviation and the direction of the bend are oriented in different directions in the reference frame of the vehicle and the lateral deviation is less than a detection threshold.

* * * * *